Dec. 26, 1950 G. A. LYON 2,535,081
WHEEL COVER
Filed July 29, 1947
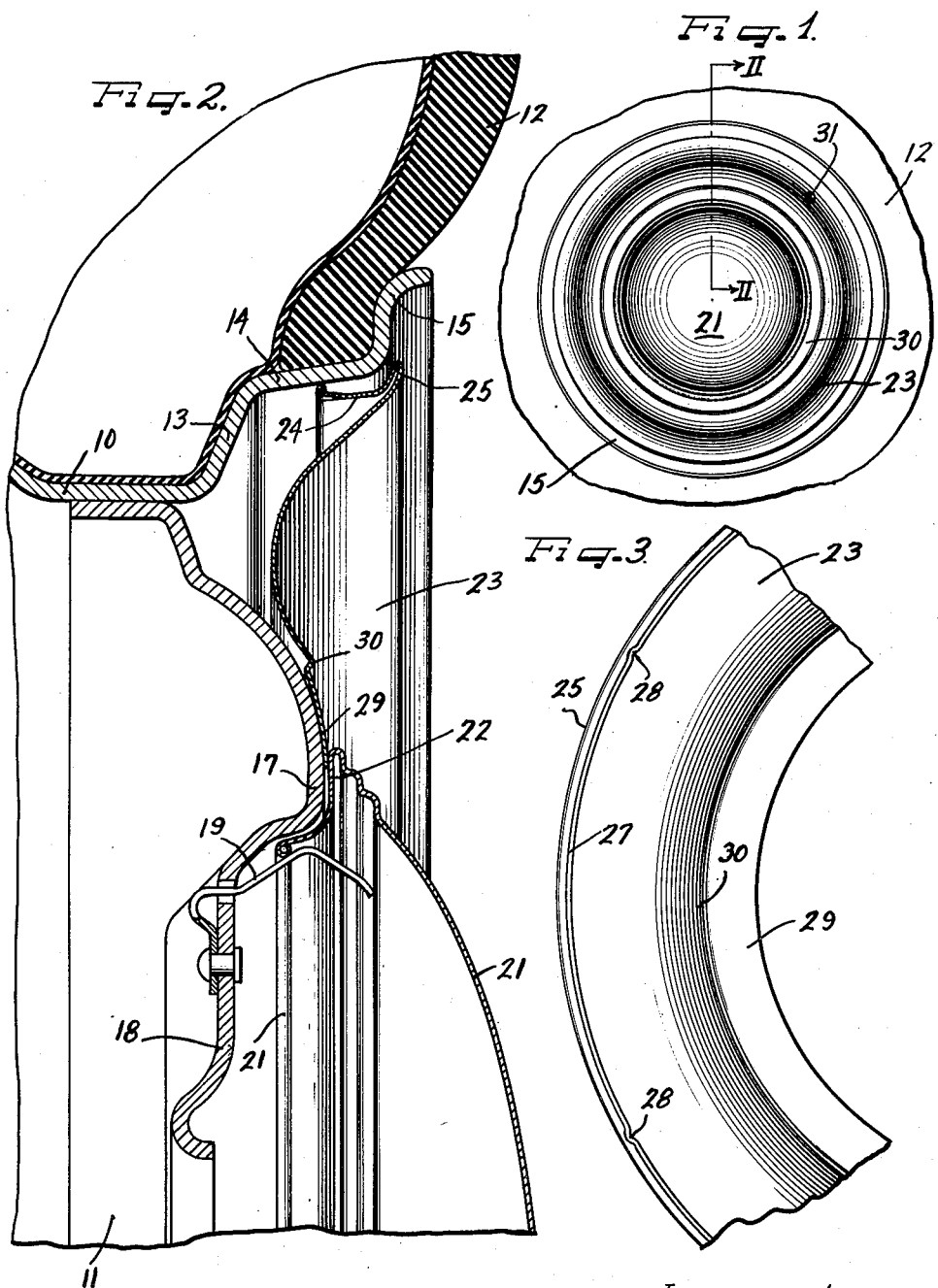
Inventor
GEORGE ALBERT LYON Patented Dec. 26, 1950

2,535,081

UNITED STATES PATENT OFFICE 2,535,081

WHEEL COVER

George Albert Lyon, Detroit, Mich.

Application July 29, 1947, Serial No. 764,353

3 Claims. (Cl. 301—37)

This invention relates to improvements in wheel structures and more particularly concerns the provision of an improved cover for the outer side of a vehicle wheel.

An important object of the present invention is to provide in a wheel structure an improved wheel cover, and more especially a trim ring which is at least partially self-retaining.

Another object of the invention is to provide a wheel cover which is especially well adapted for use on existing forms of wheels.

A further object of the invention is to provide a vehicle wheel cover which is exceptionally adaptable for accommodating itself to substantial manufacturing tolerances in the wheel to which applied.

Still another object of the invention is to provide an improved wheel trim of the type which is retained on the wheel by the hub cap but which, in the present instance, is self-centering and free from any liability to shift in a radial direction.

Yet another object of the invention is to provide an improved wheel trim which is self-tensioning and positively rattle free.

According to the general features of the present invention, there is provided in a wheel structure including a multi flange, drop center type of tire rim and a load sustaining body part having a dished central bolt-on portion covered by a hub cap, a trim ring member formed to extend radially from a substantially concealing relation to the outer side of the tire rim to the body part of the wheel and clamped to the body part by the hub cap, the radially outer margin of the trim ring being turned inwardly upon itself to extend generally radially inwardly and then axially inwardly and formed with a reinforcing out-turned marginal bead engageable in slidable, frictional relation with the opposing intermediate flange of the tire rim for holding the trim ring in a self-centered, self-tensioned, adjusted and self-retained relation to the wheel structure.

Another feature of the invention resides in the provision of spaced radially extending protuberances in the beaded edge of the inturned marginal portion of the trim ring for limiting frictional engagement of such edge with the intermediate flange of the tire rim.

According to other general features of the invention there is provided a trim ring for disposition in substantial concealing relation to the outer side of a vehicle wheel, the trim ring including a radially outer marginal portion turned upon itself radially inwardly and axially inwardly to provide a retaining flange for engagement with an intermediate flange of a multi-flanged tire rim, the axially inner extremity of the flange having radially outwardly extending integral annularly spaced protrusions for effecting limited tensioned frictional contact with the tire rim flange, the radially inner margin of the trim ring being formed to engage against the wheel body in the vicinity of the area of the wheel body engaged by the customary hub cap.

Other objects, features and advantages of the present invention will be readily apparent from the following detailed description of a preferred embodiment thereof taken in conjunction with the accompanying drawings, in which:

Figure 1 is a side elevational view of a vehicle wheel embodying a cover according to the present invention;

Figure 2 is a substantially enlarged fragmentary radial sectional view taken substantially on the line II—II of Figure 1;

Figure 3 is a fragmentary rear elevational view of the trim ring of the present invention.

As shown on the drawings:

A vehicle wheel with which the present invention is adapted to be used comprises a multi-flanged tire rim 10 supported by a load sustaining body part 11. Both the tire rim and the body part are preferably formed from suitable gauge sheet metal, the tire rim 10 being formed as a rolled section and the body part 11 being formed as a stamping.

The tire rim 10 is of the customary multi-flanged drop center type adapted to support a pneumatic tire and tube assembly 12 and comprises the usual flanges including a side flange 13, an intermediate flange 14 and a terminal or outer flange 15, only the flanges at the outer side of the tire rim being shown. The intermediate flange 14 extends generally frusto-conically, axially outwardly and radially outwardly.

The wheel body 11 is secured to the base flange of the tire rim in any preferred manner and includes an intermediate generally axially outwardly protruding annular reinforcing nose portion 17 surrounding a central dished bolt-on flange portion 18. The retaining spring clips 19 are carried by the bolt-on flange 18 and oppose the radially inner side of the nose portion 18 in suitable fashion to retainingly engage a beaded axially inwardly extending flange 20 on a hub cap 21 which is formed at its radially outer margin with a seat portion 22, which is adapted to oppose the nose portion 17 of the wheel body.

According to the present invention there is provided a wheel trim member 23 for substantially concealing the outer side of the tire rim 10 and the juncture between the tire rim and the wheel body, as well as that portion of the wheel body which would otherwise be exposed radially outwardly from the hub cap 21. The trim ring member 23 is formed to be applied to the wheel in advance of the hub cap 21 and is so constructed and arranged that the hub cap serves as the ultimate retaining means for the trim ring. However, the trim ring 23 is equipped to effect preliminary self-retaining engagement with the tire rim 10 in such a manner as to be self-assembling, and to a substantial extent self-retaining, especially when hub cap 21 is removed, and to be self-tensioning and readily adaptable to substantial dimensional variations in the wheel structure arising from liberal manufacturing tolerances.

Accordingly, the trim ring 23 is made from appropriate sheet material and is of a radial magnitude and expanse to extend from the terminal flange 15 of the tire rim radially inwardly and to the nose portion 17 of the wheel body. For the sake of affording a pleasing contoured appearance, more or less following the general contour of the wheel in which a substantial annular groove is evident between the tire rim and the wheel body, the body of the trim ring 23 is shaped on a cross-sectional contour and it may be finished in any preferred manner.

For the purpose of rendering the trim ring 23 self-centering, readily adaptable to various manufacturing tolerance variations and dimensions of the wheel components, and self-retaining and self-tensioning, the radially outer margin of the trim ring is formed with an integral generally radially inwardly and axially inwardly turned flange 24. Where the flange joins the body of the wheel trim member, it provides a reinforced visible edge 25 which overlaps the adjacent portion of the terminal flange 15 of the tire rim. The radial inward extent of the flange 24 is such that it amply clears the juncture corner between the terminal flange 15 and the intermediate flange 14 of the tire rim. The axially inward extent of the flange 24 is such that its axially inner extremity will engage with the intermediate flange 14 at an intermediate portion thereof, such as approximately on a central area thereof, and the circumference described by the inner terminus of the flange is such that engagement is effected with the intermediate flange 14 in tensioned, self-centering, self-retaining relation, although the flange 14 is of substantially uniform frusto-conical plane.

In order to increase the resilient tension of the inner extremity of the flange 24 and reinforce the same, the extremity is formed with a radially out-turned bead 27.

To increase the effectiveness of the retaining engagement of the bead 27 with the tire rim intermediate flange 14, the bead is formed at a plurality of spaced points with radially outwardly extending projections 28. These projections may be formed by deforming the bead 27 and are in any preferred number such as six equidistantly spaced about the circumference of the bead.

At its radially inner margin, the trim ring 23 is formed to lie flat against the nose portion 17 of the wheel body and to underlie the shoulder portion 22 of the hub cap so that when the hub cap is applied to the wheel after the trim ring is mounted thereon the shoulder 22 will clamp the inner trim ring margin, identified at 29, retainingly against the wheel body.

To apply the trim ring 23 it is substantially centered with respect to the wheel and pushed axially inwardly until the limited engagement protrusions 28 frictionally grip the radially inner face of the intermediate flange 14 of the tire rim and the inner margin 29 of the trim ring engages the nose portion 17 of the wheel body firmly under slight tension so that the trim ring will be free from any danger of rattling or looseness.

A readily perceivable advantage of the limited, frictional tensioned engagement afforded by the protrusions 28 resides in the free adaptability afforded thereby in the retaining flange 24 for a substantial range of inaccuracies arising from liberal manufacturing tolerances either in the circumferential formation of the tire rim flange 14 or its diameter, or its disposition relative to the wheel body and more particularly the nose portion 17 of the wheel body. That is, the flange 14 may be out of true, its frusto-conical angle may vary, or the entire tire rim may vary substantially in different wheels with respect to the median plane of the wheel body 11, and yet the retaining flange 24 will nevertheless effect a thorough self-centering, self-retaining, self-tensioning, readily adaptable grip upon the intermediate flange 14. When the hub cap 21 is removed, the trim ring 23 will, due to the retaining engagement afforded by the flange 24 maintain position on the wheel. Due to the self-centered engagement afforded by the flange 24, the trim ring 23 cannot shift radially on the wheel.

By preference a reinforcing bead 30 is formed adjacent to the inner radial margin of the trim ring and this enhances the resilience thereof.

An appropriate valve stem aperture 31 is provided in the trim ring member 23. Since the trim ring is held effectively in position on the wheel, not only by the retaining protrusions 28 but also by the clamping action of the hub cap 21, and since the retaining protrusions 28 grip the tire rim flange 14 with a relatively strong frictional tensioned engagement, the trim ring is held effectively against tendency to rotate relative to the wheel. Accordingly, registration of the valve stem aperture 31 with the valve stem is maintained in service and danger of straining the valve stem due to rotary shifting of the trim ring is avoided.

Since the inner margin of the trim ring is solidly backed by the nose portion 17 of the wheel body, application of a pry-off tool under the shoulder 22 of the hub cap will have no damaging effect upon the margin 29.

To remove the trim ring 23, a pry-off tool inserted between the reinforced edge 25 of the trim ring and the opposed portion of the tire rim will be effective to withdraw the engagement flange 24 from the tire rim flange 14 and thus release the trim ring for removal.

I claim as my invention:

1. In a wheel structure including a multi-flange, drop center type of tire rim having an intermediate generally axially extending flange and a load sustaining body part having a dished central bolt-on portion covered by a hub cap, a trim ring member formed to extend radially from a substantially concealing relation to the outer side of the tire rim to the body part of the wheel and clamped to the body part by the hub cap, the radially outer margin of the trim ring being turned inwardly upon itself to extend generally radially inwardly and then axially inwardly and formed with a reinforcing out-turned marginal bead engageable in slidable frictional relation with the opposing intermediate flange of the tire rim for holding the trim ring in a self-centered, self-tensioned, adjusted and self-retained relation to the wheel structure.

2. In a wheel structure including a multi-flange, drop center type of tire rim having an intermediate generally axially extending flange and a load sustaining body part having a dished central bolt-on portion covered by a hub cap, a trim ring member formed to extend radially from a substantially concealing relation to the outer side of the tire rim to the body part of the wheel and clamped to the body part by the hub cap, the radially outer margin of the trim ring being turned inwardly upon itself to extend generally radially inwardly and then axially inwardly and formed with a reinforcing out-turned marginal bead engageable in slidable, frictional relation with the opposing intermediate flange of the tire rim for holding the trim ring in a self-centered, self-tensioned, adjusted and self-retained relation to the wheel structure, said beaded edge of the inturned marginal portion of the trim ring having spaced radially extending protuberances for limiting frictional engagement of such edge with the intermediate flange of the tire rim.

3. A trim ring for disposition in substantially concealing relation to the outer side of a vehicle wheel, comprising an integral sheet metal structure including an annular body of concave cross section, a radially outer marginal flange extending radially inwardly and then axially and having its free margin turned radially outwardly to provide a reinforcing and resiliency-increasing bead, said bead having a plurality of radially outwardly extending distortions affording engagement protrusions adapted to engage in frictional resilient gripping relation with an opposing flange on the wheel, and an inner marginal formation adapted to engage facewise against a central portion of the wheel.

GEORGE ALBERT LYON.

REFERENCES CITED

The following references are of record in the file of this patent:

UNITED STATES PATENTS

| Number | Name | Date |
|---|---|---|
| 2,113,541 | Blank | Apr. 5, 1938 |
| 2,199,889 | Lyon | May 7, 1940 |

FOREIGN PATENTS

| Number | Country | Date |
|---|---|---|
| 503,270 | Great Britain | Apr. 4, 1939 |